United States Patent [19]
Ball et al.

[11] Patent Number: 5,138,757
[45] Date of Patent: Aug. 18, 1992

[54] PROCESS FOR MANUFACTURING A VEHICLE BRAKE DRUM

[75] Inventors: Richard C. Ball; Elvin E. Tuttle, both of Lansing; David W. Kratzer, La Salle, all of Mich.

[73] Assignee: Motor Wheel Corporation

[21] Appl. No.: 764,729

[22] Filed: Sep. 24, 1991

Related U.S. Application Data

[63] Continuation of Ser. No. 324,650, Mar. 17, 1989, abandoned.

[51] Int. Cl.[5] .................. B23Q 17/20; B23P 19/04
[52] U.S. Cl. ..................... 29/407; 29/891.1; 29/894; 29/901
[58] Field of Search ............ 29/406, 407, 527.6, 29/558, 892.1, 892.11, 894, 894.3, 897.2, 901, DIG. 26, 894.32, 894.323; 188/218 R, 218 A; 301/5 B, 63 R

[56] References Cited

U.S. PATENT DOCUMENTS

| | | | |
|---|---|---|---|
| 4,0676,098 | 1/1978 | Blair, Jr. ........................... | 29/558 |
| 3,307,251 | 3/1967 | Magyar ........................... | 29/407 X |
| 3,611,535 | 10/1971 | Nobach ........................... | 29/894.323 |
| 3,808,660 | 5/1974 | Wik ................................. | 29/407 X |
| 3,951,563 | 4/1976 | Ravenhall ....................... | 29/901 X |
| 4,262,407 | 4/1981 | Petersen et al. .............. | 188/218 R X |
| 4,354,407 | 10/1982 | Daudi et al. .................... | 301/5 B X |
| 4,523,666 | 6/1985 | Murray ........................... | 188/218 A X |
| 4,733,448 | 3/1988 | Daudi .............................. | 29/894.32 |

OTHER PUBLICATIONS

Exhibits A-B, Motor Wheel Corporation, (MWC) Study of parts 87101 & 87945, 1988.
Exhibits C-D, MWC Study, parts 87101 and 87945, 1989.
Exhibits E-F, MWC Study, parts 87101 and 87945, 1989.
Exhibits G-N, MWC Study, parts 87101 and 87945.

*Primary Examiner*—Joseph M. Gorski
*Assistant Examiner*—Peter D. Vo
*Attorney, Agent, or Firm*—Barnes, Kisselle, Raisch, Choate, Whittemore & Hulbert

[57] ABSTRACT

Manufacture of brake drums having an annular brake ring and a drum back for mounting the ring for rotation about an axis defined at least in part by one or more openings in the back. Radial runout of the brake ring is measured, and the mounting openings in the drum back are located at a position to substantially cancel the first harmonic of measured radial runout. The radially inwardly directed braking surface of the drum ring is then finish-machined on a cylinder of revolution coaxial with the drum back mounting openings so as to provide a brake ring of substantially uniform thickness and weight distribution about the axis of rotation defined by the drum back mounting openings.

3 Claims, 4 Drawing Sheets

PROCESS FOR MANUFACTURING A VEHICLE BRAKE DRUM

This is a continuation of copending application Ser. No. 07/324,650 filed on Mar. 17, 1989, now abandoned.

The present invention is directed to manufacture of balanced bodies of revolution, and more particularly to a method and apparatus for manufacture of balanced brake drums for automotive vehicles and like applications.

BACKGROUND AND OBJECTS OF THE INVENTION

Brake drums are conventionally manufactured by means of a number of differing processes and techniques. In one process commercially employed by applicants' assignee for manufacture of truck brake drums, a jacket is formed as an annular band of sheet steel. With the band externally fixtured, molten grey iron is centrifugally cast into the band to form a metallurgically bonded composite ring. After the annular drum ring has cooled, and with the ring externally fixtured, a cylindrical surface known as a rough bore is machined on the inwardly facing surface of the ring. Following this, a steel drum back or disc, having mounting openings preformed therein, is affixed to an edge of the drum ring, with the drum back mounting openings and the center of the rough bore of the ring located on a common axis. The radially inwardly directed surface of the brake ring is then finish-machined to form a braking surface as a cylinder coaxial with the drum back mounting openings. Numerous other processes for brake drum manufacture are known in the art.

In use on a vehicle or other applications, a brake drum should be balanced about its axis of rotation. Improper balance not only affects vehicle ride quality because of uneven distribution of centrifugal forces around the axis of rotation, but also greatly affects wear and operating life of the brake components themselves. Conventionally, individual finished brake drums are located on a balancing machine, and one or more weights may be affixed to the drum periphery to achieve weight-balance of the drum about is axis of rotation. However, such balancing techniques do not address an underlying problem of thickness variations of the brake ring around the circumference of the drum, which will lead to non-uniform brake wear, noise and vibration even if the drum is properly weight-balanced. Recognition of this problem has led some users, such as truck manufacturers, to specify to the drum manufacturer a maximum limit to weight that can be added to balance a drum and a maximum allowable thickness variation, resulting in scrap costs associated with drums that cannot be balanced within the maximum weight specification or meet the specified thickness variation limit.

It is therefore a general object of the present invention to provide a method and apparatus for manufacture of bodies of revolution such as brake drums that address the aforementioned problems in the art, and specifically that provide an as-manufactured brake drum having greatly enhanced weight-balance characteristics and thickness uniformity as compared with drums manufactured in accordance with conventional techniques. Yet another object of the present invention, is to provide a method and apparatus of the described character that satisfy the foregoing objectives and yet are economical to implement in manufacture of brake drums on a mass-production basis. A yet more specific object of the invention is to provide a method and apparatus for manufacture of brake drums that are substantially weight balanced about the axis of rotation of the drum back mounting openings following completion of the manufacturing process, and in which the brake ring is of substantially uniform thickness circumferentially of the mounting axis.

SUMMARY OF THE INVENTION

Briefly stated, the present invention contemplates a method and apparatus for manufacture of balanced bodies of revolution. As employed in the present application, the term "bodies of revolution" applies to bodies that are of substantially continuous circumferential structure about an axis of rotation. Two examples of such bodies discussed in the present application are brake drums and mold-formed wheels, such as cast aluminum alloy wheels. Bodies of revolution to which the subject invention applies have two radially oppositely facing surfaces, between which the structure of the body defines balance characteristics thereof with reference to the axis of revolution. In accordance with the present invention, radial runout is measured at one of the two oppositely-facing surfaces, and mounting openings are located to position the axis of the mounting openings coincident with the axis that produces a minimum first harmonic of radial runout. The other radial surface is then machined with reference to the axis of the mounting openings, such that thickness of the machined body is substantially uniform between the two radial surfaces, and the body is substantially balanced with respect to its axis of revolution. Thus, measurement and control of a geometric characteristic at one surface, which is not itself directly related to weight-balance—i.e., the first harmonic of radial runout with respect to the axis of revolution—combined with a subsequent machining operation on the opposing surface, yields a body of revolution that is substantially weight-balanced about its axis of revolution as manufactured and has minimum thickness variation.

As applied specifically to brake drums, the mounting opening or openings in the mounting back of a brake drum having an annular brake ring are located by first measuring radial runout of the annular brake ring with respect to a reference axis, and then placing the mounting opening or openings in the drum back at a position to offset and at least partially cancel measured radial runout. Specifically, the mounting opening axis is positioned to minimize, preferably eliminate, the first harmonic of radial runout, thereby effectively canceling the first harmonic. The drum braking surface is subsequently finish-machined with reference to the mounting opening axis. Location of the mounting opening axis in accordance with the present invention thereby results in more uniform geometric location of the braking surface with respect to the opposite radial surface of the ring, and thus yields a drum having a brake ring of substantially uniform thickness and balance.

Moreover, in implementation of the invention, it has been found that measurement of radial runout, and identification of a plurality of runout harmonics in addition to the first harmonic, yield additional information that can beneficially be employed in improving the overall process of drum manufacture. For example, the summation of the second and higher harmonics of radial runout may be of such amplitude that the ring cannot produce a satisfactory drum because thickness variations of the ring in the final drum would still exceed required limits. In this case, the drum ring can be rejected without incurring the expense associated with additional manufacturing and inspection steps. Furthermore, harmonics can be coordinated with preceding stages of the manufacturing process for identifying manufacturing anomalies. The fourth and eight harmonics of radial runout have been associated with the eight fixturing jaws in the centrifugal casting machine employed by applicants' assignee, so that a high fourth or eight harmonic can be associated with possible misalignment or missetting of the centrifugal casting machine.

Thus, in manufacture of brake drums in accordance with the present invention having an annular brake ring and a central back or web for mounting the brake ring for rotation about an axis defined at least in part by one or more openings in the web, external radial runout of the annular brake ring is first measured, and the mounting openings in the web are then located at a position to produce an axis of rotation to offset and substantially cancel the first harmonic of measured radial runout. In manufacture of brake drums, in which the drum back takes the form of a separate back having one or more mounting openings preformed therein, the drum back is affixed to the ring with the preformed mounting openings(s) located to produce a zero first harmonic of radial runout in the drum ring. The radially inwardly directed braking surface of the drum ring is then machined on a cylinder of revolution coaxial with the drum back mounting opening(s) so as to provide a brake drum is which the ring is of substantially uniform thickness and weight distribution about the axis of rotation defined by the drum back mounting opening(s).

Apparatus for implementing the foregoing method in accordance with a presently preferred embodiment of the invention includes a conveyor for presenting preformed drum rings in sequence. A plurality of position sensors are disposed in a circumferential array above an elevator for lifting the drum rings in turn to a position surrounded by the sensors. The sensors operatively engage the external periphery of the drum ring and provide electrical signals to a computer-based controller as a function of radial position of the outside surface of the ring with respect to a reference axis defined by the elevator. A plurality of harmonics of radial runout are calculated by Fourier analysis. If one or more harmonics (or a summation of harmonics) exceed preset inspection thresholds, the drum ring is removed form the conveyor line. A drum back has its preformed mounting opening or openings fixtured in a tooling assembly, and is lowered against the drum ring edge along a fixed tooling axis. In the meantime, the drum ring on the elevator (one having passed the acceptance test) is repositioned (if necessary) so as to reduce, preferably to zero, the first harmonic of radial runout of the drum ring periphery with respect to the tooling axis. The drum back is then tack welded to the drum ring, and the assembly is moved by the conveyor to further manufacturing stages in which welding is completed and the drum braking surface is finish machined coaxially with the mounting openings. In the preferred implementation of the invention, the drum-inspection and drum back-assembly operations are performed at separate stations so as to enhance throughput of the overall manufacturing process.

BRIEF DESCRIPTION OF THE DRAWINGS

The invention, together with additional objects, features and advantages thereof, will be best understood from the following description, the appended claims and the accompany drawings in which:

DETAILED DESCRIPTION OF PREFERRED EMBODIMENTS

Figure 1:
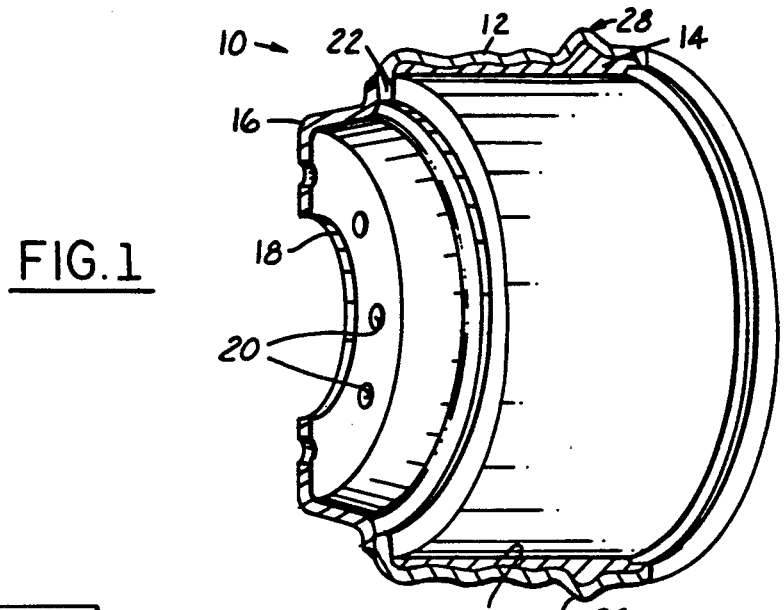
FIG. 1 is a diametrically sections perspective view of a finished brake drum in accordance with a presently preferred implementation of the invention.

FIG. 1 illustrates a brake drum 10 as comprising an annular shell or band 12 surrounding and metallurgically bonded to a cast iron structure 14. A drum mounting disc or back 16 is welded to one edge of band 12 and has openings 18, 20 for mounting drum 10 to rotate about an axis defined by the mounting openings. In manufacture of drum 10, band 12 is first formed from sheet steel stock and rolled to a configuration having the inwardly-turned end flange 22 and a plurality of outwardly directed strengthening ribs 26. (A second inwardly-turned end flange 24 (FIGS. 3 and 5) is formed in the rolling operation but removed in the finish-machining operations.) With band 12 externally fixtures, grey iron structure 14 is then centrifugally cast therein to form a composite brake ring 28. After the ring has cooled, drum back 16 is welded to flange 22 (after the ring has been measured and the drum back fixtured in a predetermined assembly orientation for welding in accordance with the present invention). The radially inwardly directed braking surface 30 of ring 28 is then finished on a cylinder of revolution coaxial with mounting openings 18, 20, and flange 24 (FIGS. 3 and 5) is removed to form the completed drum.

Figure 2:
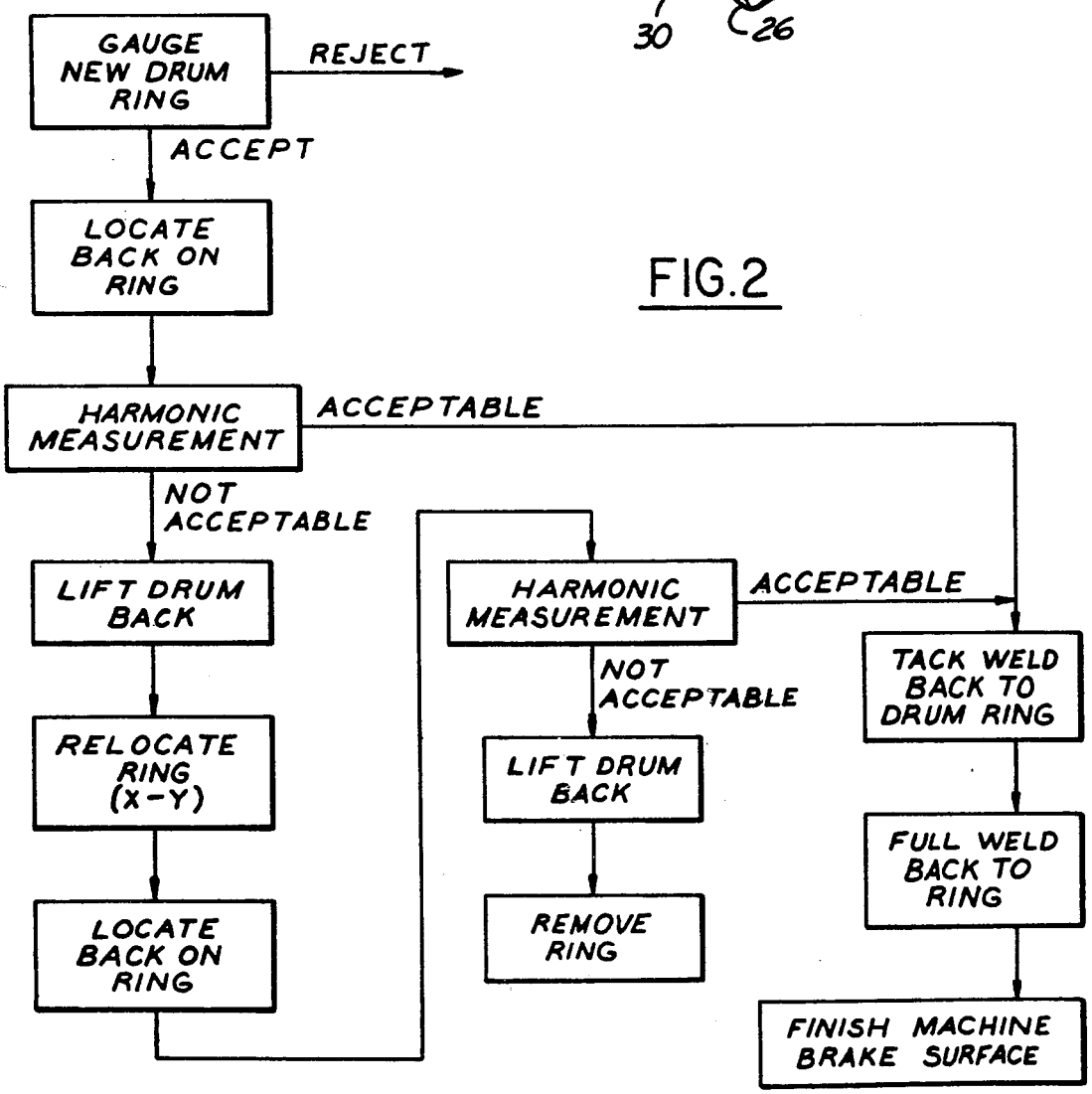
FIG. 2 is a flow chart that illustrates manufacture of brake drums in accordance with a presently preferred embodiment of the invention.

More particularly, and in accordance with a presently preferred embodiment of the invention illustrated diagrammatically in FIG. 2, a drum ring 28 is initially inspected or gauged by measurement of radial runout of the drum ring with respect to a fixture reference axis. A plurality of harmonics of radial runout are identified, and the amplitude of the individual harmonics, or the summation of selected harmonics, is compared to a preselected threshold. If the selected harmonics or harmonic summation exceeds the preset threshold, indicating that thickness variations of the finished drum ring will not be within desired specifications, or indicating some other quality problem, the drum ring is immediately rejected and not subject to further manufacturing operations.

On the other hand, if the harmonics or harmonic summations are within predetermined acceptable tolerances, a drum back 16 is placed on the drum ring so as to locate the mounting openings 18, 20 coaxially with the first harmonic of radial runout of the ring. That is, the drum back is positioned on the ring to locate the central axis of opening 18 and/or openings 20 so that the first harmonic of radial runout of the ring/back assembly, measured with reference to the mounting opening axis, will be substantially zero. The first harmonic of radial runout is then again measured and, if within acceptable tolerances, the drum brake is tack welded to the drum ring. However, if the first harmonic is not within acceptable limits, the drum back is lifted nd the drum ring is relocated. The drum back is again placed on the ring and the first harmonic of ring radial runout is again measured with resect to the axis of the drum back mounting openings. If this second measurement is within acceptable limits, the drum back is tack welded to the ring. However, if this second measurement is still not within acceptable limits, the drum back is lifted form the ring and the ring is removed from the assembly line. The drum back is held for use in conjunction with the next ring. After the drum back is tack welded to the ring, the drum subassembly is conveyed to a subsequent station in which a full weld is formed to fasten the back to the ring, and then to one or more additional stations at which drum brake surface 30 (FIG. 1) is finish-machined on a cylinder of revolution coaxial with drum back mounting openings 18, 20, and rear ring flange 24 is removed as previously described.

Figure 3:
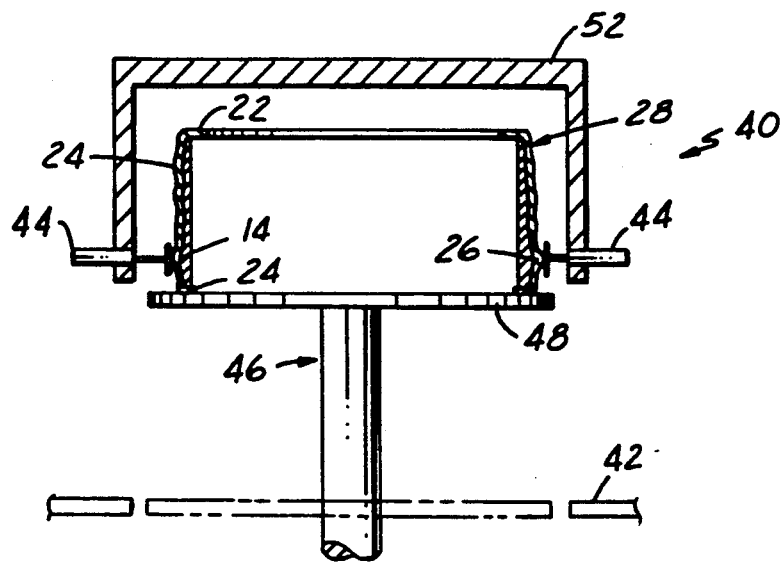
FIGS. 3 and 4 are schematic diagrams that illustrate drum ring inspection in accordance with the process of FIG. 2.
Figure 4:
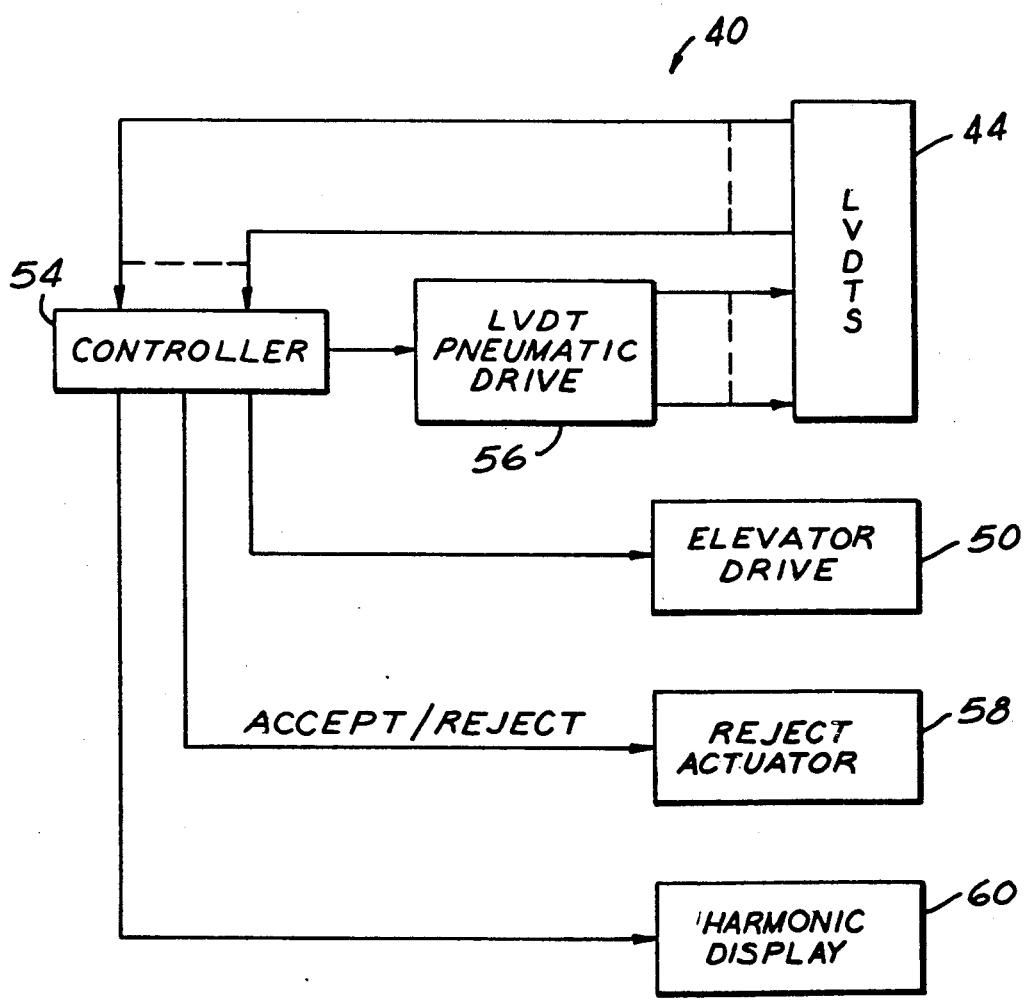

FIGS. 3 and 4 schematically illustrate an inspection station 40 for gauging new drum rings in accordance with the first step of the process of FIG. 2. Drum rings 28 are presented in sequence by a conveyor 42. An elevator 46 includes a platform 48 for receiving drum rings 28 in sequence from conveyor 42. Platform 48 is coupled to an elevator drive 50 (FIG. 4) for lifting each drum ring to an elevated potion at which the drum ring is surrounded by a circumferential array of position sensors 44. In one preferred implementation of the invention, sensors 44 comprise twenty-four pneumatically-driven LVDT sensor carried in a uniformly spaced array by a suitable mounting element 52 at a position to externally engage the largest strengthening rib 26 on the periphery of drum ring shell 12. (Rib 26 and lower flange 24 are carried on elevator 48 so that rib 26 is in the plane of the array of sensors 44.) A computer-based controller 54 receives electrical signals from sensors 44 indicative of radial position of the sensing elements, and thus radial position of the outside surface of rib 26, relative to a reference axis defined by elevator platform 48. Controller 54 (FIG. 4) has outputs coupled to the LVDT pneumatic drive mechanism 56, to elevator drive 50, to a reject actuator 58 positioned adjacent to conveyor 42 downstream of inspection station 40, and to a harmonic display 60 such as a monitor or chart printer.

Figure 7:
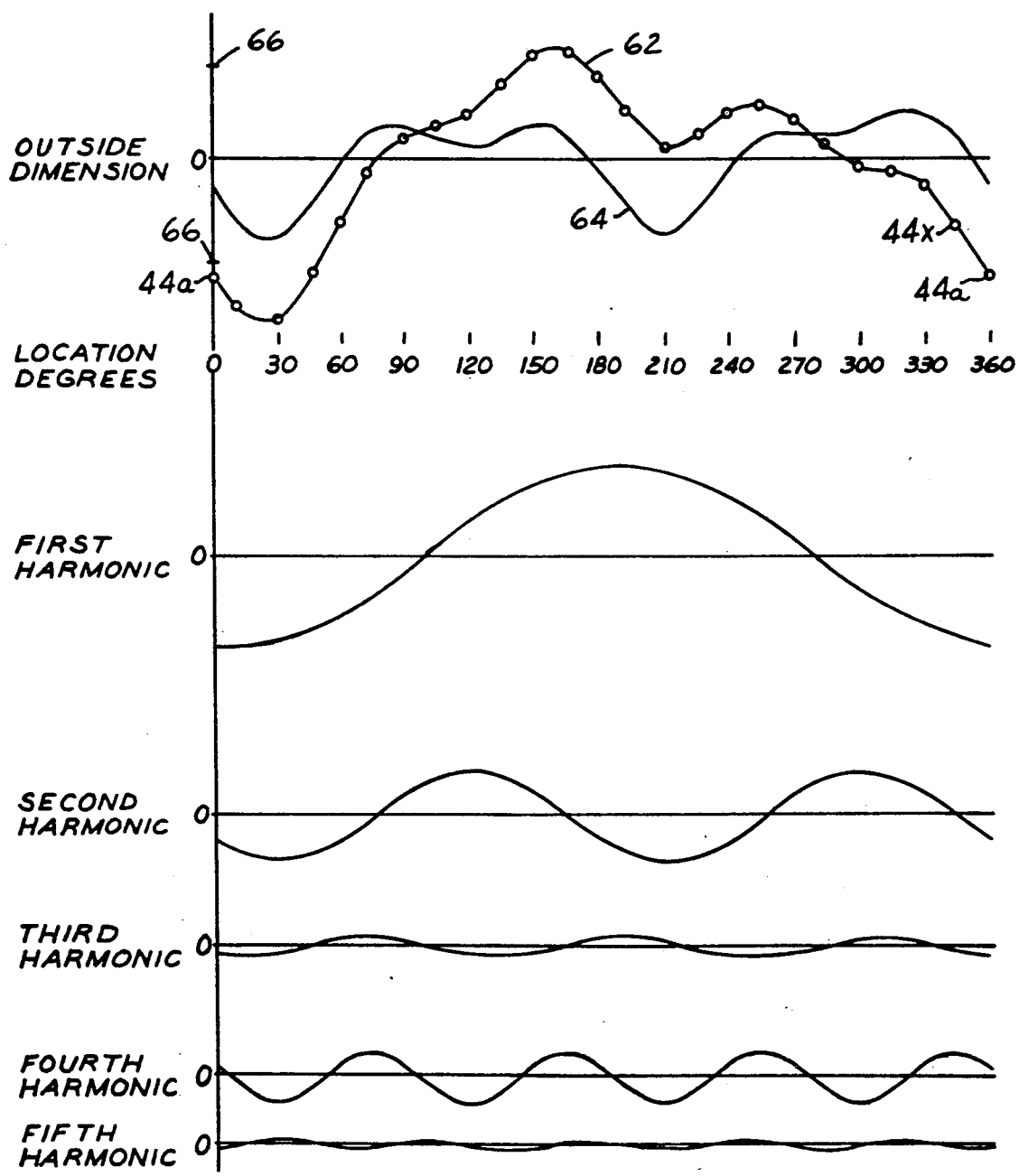
FIG. 7 is a graphic illustration useful in describing operation, features and advantages of the invention.

Controller 54 computes harmonics of radial runout of ring 28 in accordance with conventional Fourier analysis techniques. FIG. 7 illustrates the measurement points 44a–44x of the twenty-four sensors 44 positioned at 15° intervals around the periphery of one exemplary drum ring. FIG. 7 also illustrates the first through fifth harmonics of radial runout calculated from measurement points 44a–44x, the summation 62 of the first through fifth harmonics (which closely approximates actual radial runout of the ring) and the summation 64 of the second through fifth harmonics. (In a presently preferred implementation of the invention, up to eleven harmonics are identified for diagnostic purposes, of which only five are illustrated in FIG. 7 for purposes of discussion.) Controller 54 compares the summation 64 of the second through fifth harmonics to predetermined thresholds 66, which are based upon empirical data indicated of maximum harmonic summations associated with drum thickness variations that are acceptable in a finished drum. It will be noted that, if a drum were to be assembled with the back located with a substantial first harmonic to the ring center, a gross radial runout approximation 62 would exceed limits 66. Elimination of the first harmonic of radial runout by correct mounting brings the summation 64 of the remaining harmonics within these manufacturing tolerances.

Figure 5:
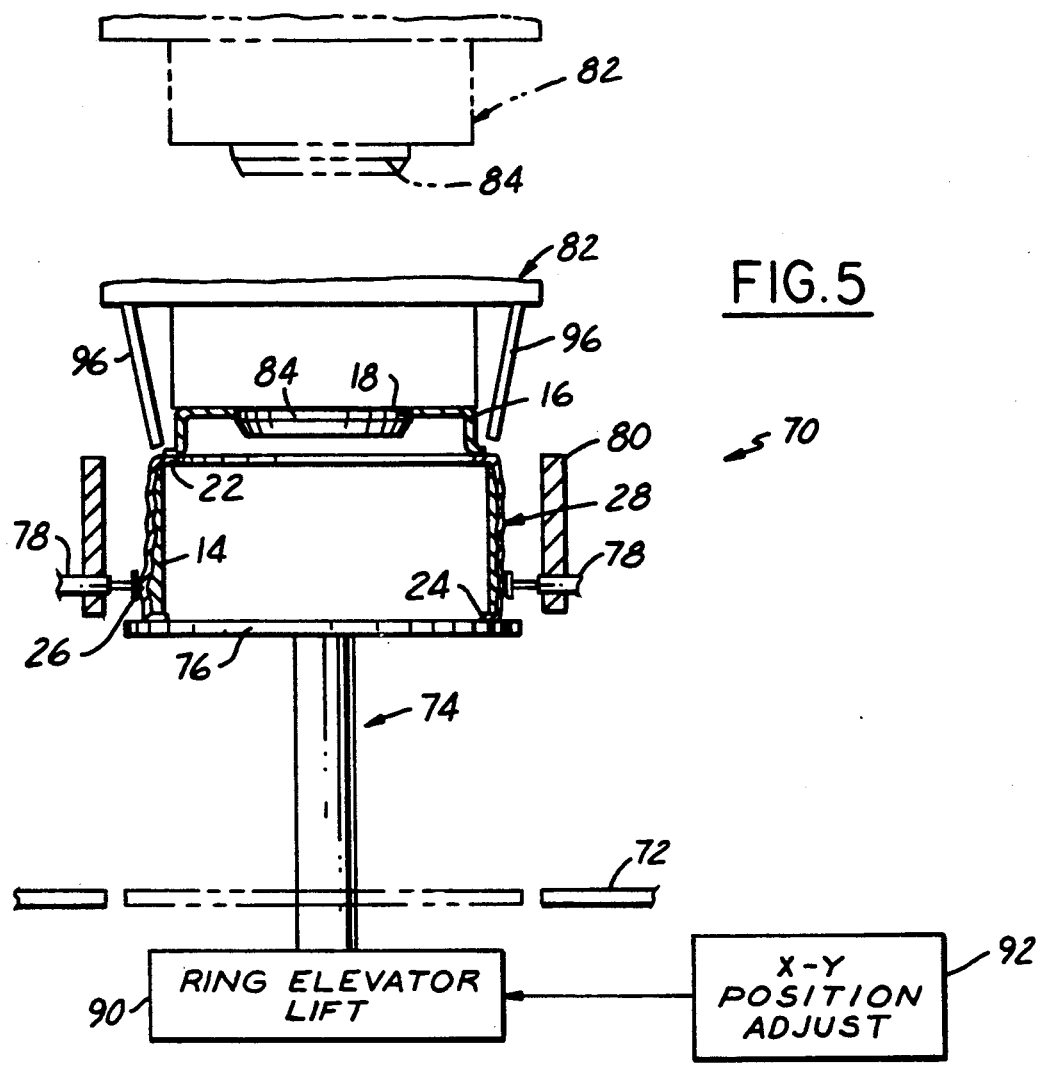
FIGS. 5 and 6 are schematic diagrams that illustrate assembly of the drum back to the drum ring in accordance with the process of FIG. 2.
Figure 6:
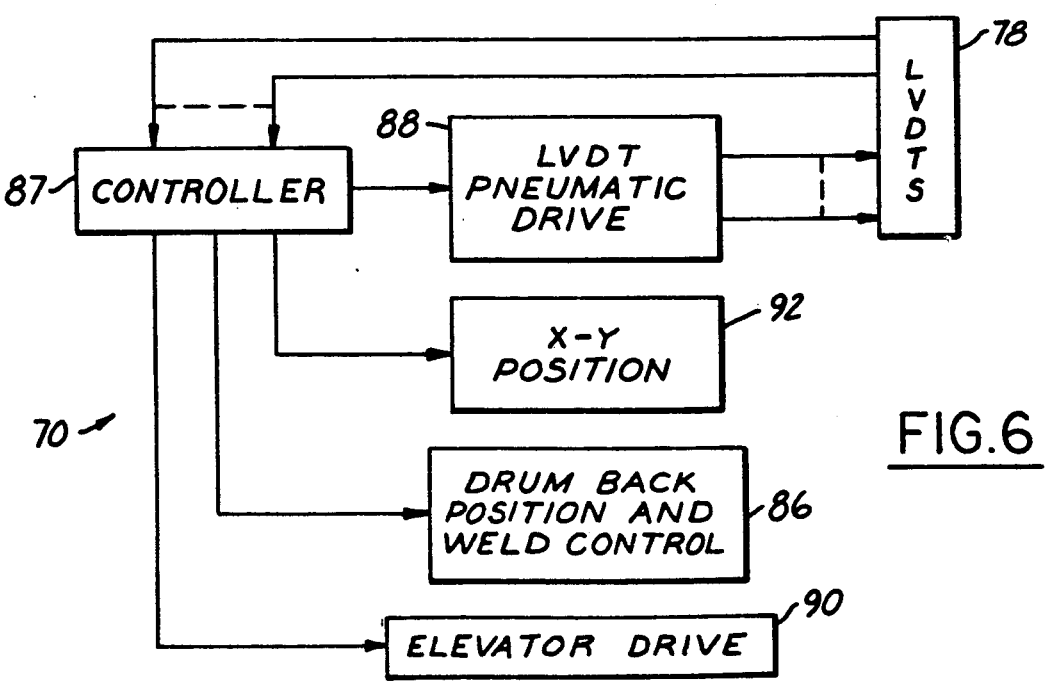

FIGS. 5 and 6 illustrate a station 70 for assembling drum back 16 to drum ring 28 in accordance with the preferred method of FIG. 2. Drum rings 28 are presented in sequence along a conveyor 72, and an elevator 74 is again positioned to receive the drum rings in turn and to lift the drum rings to an elevated measurement and assembly position. A drum ring carried by elevator platform 76 is positioned for engagement by a plurality of position sensors 78. Since only the first harmonic of radial runout is of interest at assembly station 70, there can be lesser number of sensors 78 at the assembly station than at inspection station 40 (FIGS. 3–4). In a preferred implementation of the invention, sensors 78 comprise eight pneumatically-driven LVDT sensors carried by a mounting bracket 80 in a uniformly spaced circumferential array at a position so that the sensing elements operatively engage the highest strengthening rib 26 on the drum ring periphery. A tooling assembly 82 receives drum backs 16 in sequence from a suitable conveying mechanism (not shown), and has a central radially expansible collet 84 in ripping and clamping engagement with central mounting opening 18 of drum back 16. Tooling 82 is coupled a drive mechanism 86 (FIG. 6) for reciprocation between an upward position illustrated in phantom in FIG. 5 for receiving drum backs 16 and holding the drum backs at a position spaced from rings 28, and a lowered position illustrate din solid lines in FIG. 5 at which drum back 16 is placed on ring 28 with mounting opening 18 fixtured on the central axis of collet 84 in tooling assembly 82.

A computer-based controller 87 has inputs that receive the position-indicating output signals of sensors 78, and has an output coupled to the sensor pneumatic drive mechanism 88. Controller 87 also operates a drive mechanism 90 for lifting and lowering elevator 74, and a mechanism 94 for adjusting position of elevator 74, and thus position of ring 28 carried thereby, n the X and Y directions coplanar with platform 76, flange 24 and rib 26, and perpendicular to the axis of tooling 82. An array of welding torches 96, preferably four welding torches at uniform angular spacing, are carried by tooling 82 for tack welding the periphery of drum back 16 to ring 28 upon obtaining an acceptable harmonic measurement. The tack-welded assembly is then lowered by elevator 74 and moved by conveyor 72 to subsequent stations at which the welding operation is completed by conventionally forming a circumferentially continuous weld between the back periphery and ring flange 22, and the drum finish-machining operation is performed as previously described.

It will thus be appreciated that the method and apparatus hereinabove described fully satisfy all of the objects and aims previously set forth. It will also be recognized that the presently preferred embodiment of the invention herein disclosed is amenable to numerous variations and modifications without departing for the principles of the present invention in their broadest aspect. For example, whereas the drum ring is repositioned in the preferred embodiments of the invention, the drum ring could be held stationary and the drum back repositioned without departing from the principles of the invention. The present invention is by no means limited to use in conjunction with brake drums of the type illustrated in FIG. 1, but can be employed in conjunction with other types of brake drums. By way of example, for drums in which the brake surface ring and mounting disc or back are formed as one unit, either in an integral casting operation or one in which the brake ring is cast onto a preformed drum back, the principles of the present invention may be implemented by forming or machining the drum back mounting openings at assembly stage 70 rather than assembling the drum back onto the drum ring at that stage.

The principles of the present invention may also be employed in conjunction with other bodies of revolution, such as mold-formed wheels—e.g., cast aluminum alloy wheels. Wheels of this character comprise a rim having radially outwardly facing bead seats that are machined for sealing engagement with tire beads and an integral disc with mounting openings machined therein for mounting the wheel and tire on a vehicle. In implementing the present invention to wheels of this character, radial runout of the inner surface of the rim is first measured, and one or more disc mounting openings are formed on an axis coincident with the axis that reduces to zero the first harmonic of rim radial runout. The radially outer surface of the rim, forming the bead seats and the rim drop well, are then machined coaxially with the axis of the mounting openings(s). The resulting wheel has a rim of substantially uniform thickness and balance.

Likewise, other techniques may be employed for measuring radial runout, such as placement of the drum ring on a rotatable bed adjacent to a single measurement sensor and sampling sensor output at increments of ring rotation. Gauging station 40 (FIGS. 3 and 4) and assembly station 70 (FIGS. 5 and 6) may be combined, although provision of separate stations is presently preferred to enhanced throughput, as previously noted. Thus, the invention encompasses the foregoing and all other modifications and variations as fall within the spirit and broad scope of the appended claims:

In the embodiments of the invention herein disclosed, it will be appreciated that, although the sensors 44 (FIGS. 3-4) and 78 (FIGS. 5-6) are uniformly spaced with respect to the respective machine axes, the sensors are not necessarily uniformly spaced around the drum ring. That is, when the ring is initially eccentric to the machine axis, circumferential spacing between sensors at the ring periphery will be greater on the side in the direction of eccentricity than on the opposing side.

Geometric measurement distortions occur, but ar minimal. When the part is moved (FIGS. 5-6) toward the machine axis, such distortions are reduced or eliminated.

It will be also be recognized that translating data between polar coordinates for measurement and correction and rectangular coordinates for analysis is not mathematically precise. Harmonic amplitudes are small as compared with part radius, about 2% of part radius, so resulting errors are small.

We claim:

1. In a process for manufacture of a vehicle brake drum having an annular drum ring with a radially inwardly oriented braking surface and a radially outwardly oriented peripheral surface, and a drum back having at least the mounting opening for mounting the drum to rotate about an axis defined by said at least one mounting opening, a method of improving weight balance of the drum about said axis and radial thickness uniformity of the drum ring between said surfaces, said method comprising the steps of:
   (a) measuring radial runout of said radially outwardly oriented surface to determine the magnitude and orientation of the first harmonic of radial runout of said outwardly oriented surface,
   (b) locating said at least one mounting opening in said drum back at a position substantially to cancel said first harmonic of said radial runout of said outwardly oriented surface, and then
   (c) finish machining said radially inwardly oriented braking surface on a cylinder of revolution substantially coaxial with said at least one mounting opening located on said step (b) so as-to improve as manufactured weight balance of said drum with respect to said axis of said at least one mounting opening and reduce radial variation in thickness of said drum ring between said surfaces around said axis.

2. The process set forth in claim 1 wherein said step (b) comprises the steps of:
   (b1) forming said drum back separately from said annular brake ring and having said at least one mounting opening preformed therein, and
   (b2) affixing said drum back to said annular brake ring with said at least one opening located with resect to said annular brake ring so as to cancel said first harmonic of radial runout.

3. The process set forth in claim 2 wherein said outwardly oriented surface has at least one circumferential rib formed thereon, and wherein said step (a) comprises the step of measuring radial runout of said rib.

* * * * *